United States Patent [19]

Bauer

[11] Patent Number: 4,698,617
[45] Date of Patent: Oct. 6, 1987

[54] ROM PROTECTION SCHEME
[75] Inventor: Jerry R. Bauer, San Jose, Calif.
[73] Assignee: American Microsystems, Inc., Santa Clara, Calif.
[21] Appl. No.: 613,115
[22] Filed: May 22, 1984
[51] Int. Cl.$^4$ ........................................... H03M 13/00
[52] U.S. Cl. ............................. 380/28; 340/347 DD; 380/4; 380/46; 380/48
[58] Field of Search ..................... 340/347 DD, 347 P; 370/18; 364/717; 178/22.01–22.19

[56] References Cited

U.S. PATENT DOCUMENTS

| | | | |
|---|---|---|---|
| 3,920,894 | 11/1975 | Shirley et al. | 178/22 |
| 4,176,247 | 11/1979 | Englund | 178/22.19 |
| 4,202,051 | 5/1980 | Davida | 178/22.15 |
| 4,475,208 | 10/1984 | Ricketts | 375/1 |
| 4,531,022 | 7/1985 | Pioli | 178/22.19 |
| 4,555,591 | 11/1985 | Nash | 178/22.13 |

OTHER PUBLICATIONS

Commander and Vose, "How Safe is Your Software", Microcomputing, Jul. 1982, pp. 60–62.

Primary Examiner—William M. Shoop, Jr.
Assistant Examiner—Saul M. Bergmann
Attorney, Agent, or Firm—Alan H. MacPherson; Paul J. Winters; Kenneth E. Leeds

[57] ABSTRACT

The present apparatus provides for the encoding of data carried on bus lines running between integrated circuits in order to protect the data carried upon those bus lines, with encoding and decoding circuits included for providing those functions in regard to the data on the bus lines.

15 Claims, 10 Drawing Figures

ROM PROTECTION SCHEME

BACKGROUND OF THE INVENTION

This invention relates to an apparatus and method for protecting computer code placed in internal circuitry within a computer, sometimes known as firmware. This invention accomplishes this by "scrambling" or altering data placed on the data bus from circuit firmware according to a given encoding word and a predetermined circuit matrix.

The unauthorized copying of data placed in firmware poses a threat to the integrity of the computer industry. Typically, the quantity of data placed in firmware is not great, but it is often extremely crucial to the operation of a particular machine (e.g. computer bootstraps, video games, computer operating systems and the like). For factory programmed read-only memories (ROMs) or for field programmable read-only memories (PROMs) the stored data may reveal crucial information about the operation of the system. One approach to protecting such data is to provide a fusible link in the array so that the data, once programmed, simply cannot be externally accessed. See, e.g., R. Birkner, et al., U.S. Pat. No. 4,124,899, "Programmable Read-Only Memory", which is hereby incorporated by reference. This approach has the disadvantage that, once the fuse is opened, the PROM may not be altered and the use of diagnostic routines is thereby inhibited.

Copy protection schemes fall into four broad categories: hardware dependent approaches, load format alteration, software that checks the environment as it executes, and software that executes through a "filter". In each case the protection schemes involve an interaction of software and hardware. Where software is used, a microprocessor is usually involved so that one convenient technique of copying is to intercept the instructions and data supplied to the microprocessor. This invention makes interception of that data more difficult. The various approaches that have been used to protect software are discussed in *J. Commander*, et al., "How Safe is Your Software?", Microcomputing, Jul. 1982 p. 60 which is hereby incorporated by reference.

It is desirable for data protection circuitry to be composed of as few components as possible. This yields two benefits. First, the amount of area utilized in a particular integrated circuit chip for the purposes of data protection circuitry is held to a minimum. Second, each component in a particular data path slows the propagation of data by a specific amount determined by the characteristics of the device in the data path; the fewer components in the data path the faster the circuit can operate.

It is an object of this invention to encode data carried on data lines running between integrated circuits in a certain predetermined manner in order to protect the data carried upon those data lines. Further, it is an object of this invention to do this with a minimum number of components.

SUMMARY

An encoding Exclusive-OR gate is provided for each data transmission lead. One input lead of each encoding Exclusive-OR gate is connected to the corresponding incoming data transmission lead in order to receive data to be transmitted on accessible data lines. The other input lead of each encoding Exclusive-OR gate is connected via a code matrix to a source of a random M-bit binary number. The output signal provided by each Exclusive-OR gate is the encoded data bit which is applied to one of the accessible data lines.

The encoded data is decoded by a circuit similar to the encoding circuit. In the decoding circuit a decoding Exclusive-OR gate is provided for each data transmission lead. One input lead of each decoding Exclusive-OR gate is connected to an incoming encoded data transmission lead. The other input lead to the decoding Exclusive-OR gate is connected via a code matrix which is similar to the code matrix provided in the encoding circuit, to a source of a random M-bit binary number, where the M-bit binary number is the same M-bit binary number provided in the encoding circuit. The output leads of the decoding Exclusive-OR gates are the transmission lines which carry the decoded data.

The encoding matrix and the random M-bit word are the same in the encoding and decoding circuit, so the data on the output leads of the Exclusive-OR gates is properly decoded.

However, the data on bus lines running between integrated circuits, and which therefore may be intercepted through the use of logic probes, is in encoded form, thereby substantially increasing the effort required to illicitly determine the data stored in firmware.

BRIEF DESCRIPTION OF THE DRAWINGS

FIG. 6b shows a cross-sectional view of the integrated circuit electrical conductor pattern shown in FIG. 6a;

Table 1 shows the status of a particular bit in the data word as it is encoded and subsequently decoded by the embodiment of the present invention shown in FIGS. 2a, 2b, 4a and 4b; and Table 2 is a truth table for an Exclusive-OR gate.

DETAILED DESCRIPTION

Figure 1:
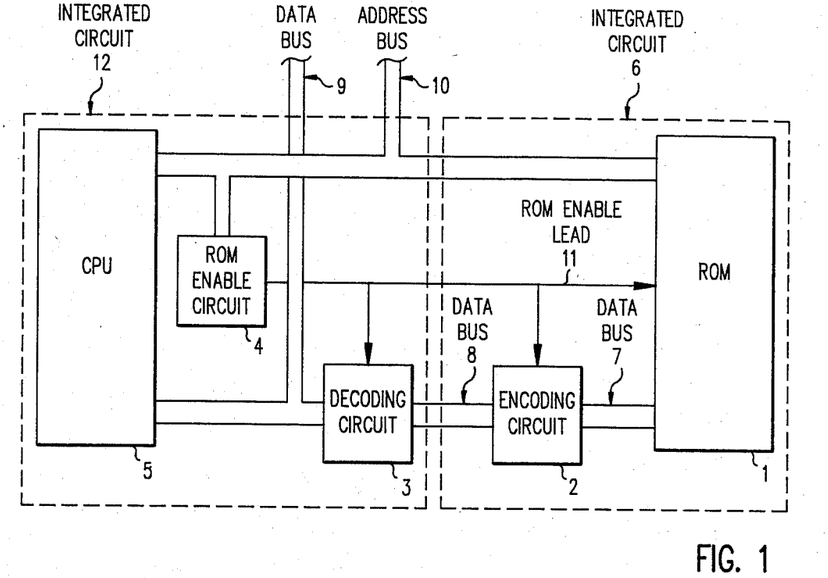
FIG. 1 is a block diagram of structure including a processor capable of addressing a read-only memory, together with one embodiment of the present invention used to both encode and decode the data being accessed from the read-only memory.

FIG. 1 shows a block diagram of a circuit constructed in accordance with one embodiment of the present invention. Read Only Memory (ROM) 1 is controlled by central processing unit (CPU) 5 via address bus 10 and ROM enable circuit 4. Address bus 10 contains a plurality of data lines 10-1 through 10-k where k is a selected integer. When CPU 5 addresses a memory word contained in ROM 1 (via address bus 10), ROM enable circuit 4 provides a logical 1 enable signal to ROM 1. ROM 1 then places the selected data word (i.e., the data word stored within ROM 1 which corresponds to the address provided by CPU 5 on address bus 10) on data bus 7. Circuit 2 encodes the data placed on data bus 7, and places the encoded data on bus 8. Circuit 3 decodes the data placed on data bus 8, and places the decoded data on data bus 9. In a preferred embodiment, only data bus 8 runs between integrated circuits 6 and 12 and therefore only data bus 8 can be accessed without dismantling integrated circuits 6 or 12.

Figure 2A:
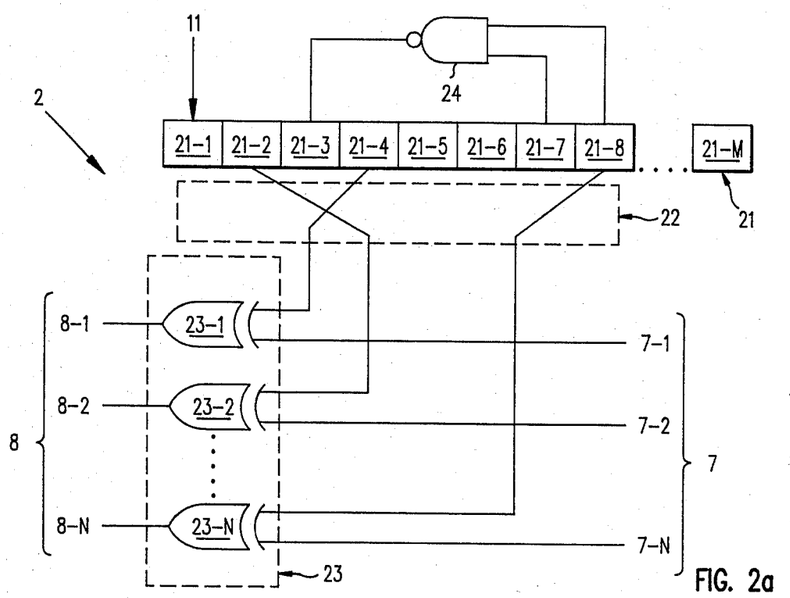
FIGS. 2a and 2b are schematic diagrams showing one embodiment of the encoder and decoder, respectively, of the present invention suitable for use in the structure of FIG. 1.
Figure 2B:
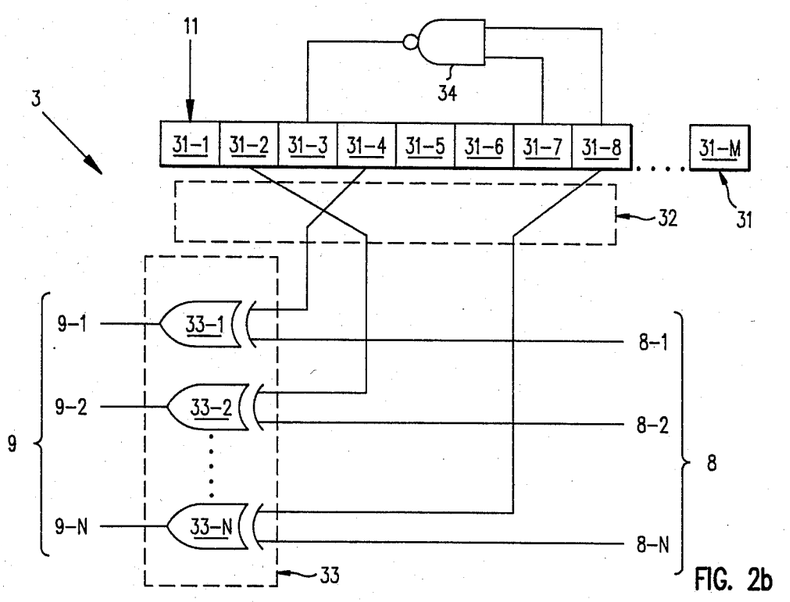

FIGS. 2a and 2b are schematic diagrams of one embodiment of encoder 2 and decoder 3, respectively, of FIG. 1. Input data is applied to circuit 2 of FIG. 2a via data bus 7, which in the embodiment of FIG. 2a includes a plurality of N data leads 7-1 through 7-N, and which is capable of receiving an N bit data word. Exclusive-OR gate bank 23 contains a plurality of N Exclusive-OR gates 23-1 through 23-N, each uniquely associated with a single one of data leads 7-1 through 7-N, respectively. Each data lead 7-1 through 7-N in data bus 7 is connected to one input lead of its corresponding Exclusive-OR gate 23-1 through 23-N, respectively, in Exclusive-OR gate bank 23. The other input leads of Exclusive-OR gates 23-1 through 23-N are connected to M-bit counter 21 by coding matrix 22. M-bit counter 21 as shown of FIG. 2a is connected to the output lead 11 of ROM enable circuit 4 of FIG. 1. M-bit counter 21 is a means for providing an M-bit encoding/decoding word. NAND gate 24 is provided to cause M-bit counter 21 to function as a so-called "pseudo-random" word generator.

Counters are well known in the art. A counter provides a logical M-bit number in a predictable and well known manner. An M-bit pseudo-random counter provides an M-bit number in a predictable manner. How a particular pseudo-random counter will behave is difficult for a potential unauthorized software copier to ascertain. Gate 24 alters the bit connected to the output lead of gate 24 in response to the input signals applied to gate 24 by counter 21. Because gate 24 changes the manner in which counter 21 operates, the combination of counter 21 and gate 24 is referred to as a pseudo-random counter. A pseudo-random counter behaves predictably, if one knows how a pseudo-random counter is designed. The specific connections of the input and output leads of NAND gate 24 are provided as an example only. Other connections of input and output leads and the use of other types of logical gates, including logic gates of other than two input leads or one output lead, will become obvious to one skilled in the art in light of the teachings of this invention. Gate 24 alters the bit connected to the output lead of gate 24 in response to the input signals applied to gate 24 by counter 21.

Figures 3A, 3B:
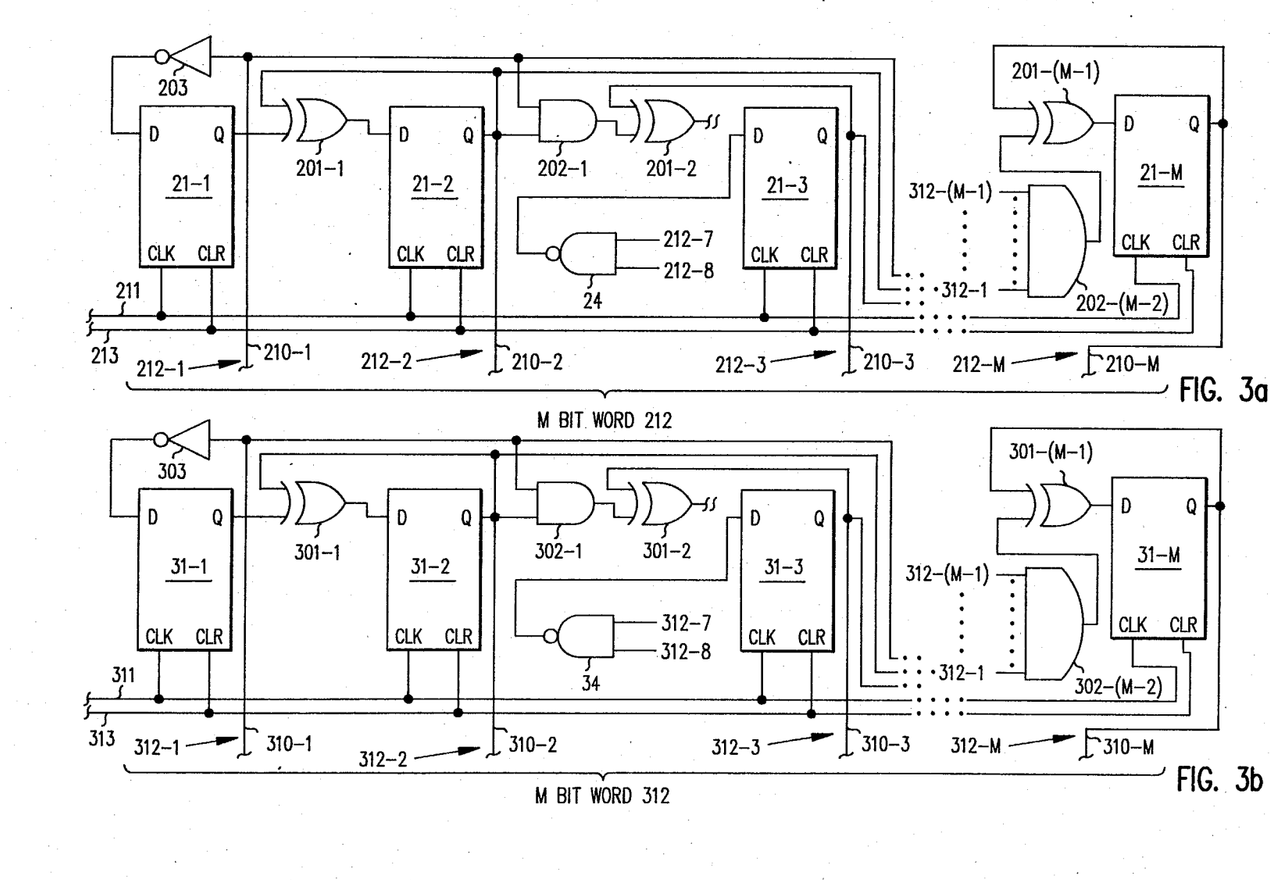
FIGS. 3a and 3b are logic diagrams showing one embodiment of counters 21 and 31 in FIGS. 2a and 2b, respectively.

Of importance, the M-bit encoding word is used in encoder circuit 2 of FIG. 1 and the M-bit decoding word used in decoder circuit 3 of FIG. 1 must be identical in order for the encoded data placed on bus 8 to be properly decoded and set onto bus 9. FIGS. 3a and 3b are logic diagrams of embodiments of counters 21 and 31 in FIGS. 2a and 2b, respectively. The operation of counters in general and these counters specifically are well known in the prior art by the terms "shift counters" or "shift registers". The counters shown in FIGS. 3a and 3b are provided by way of example only. The use of other types of counters will become obvious to those of ordinary skill in the art in light of the teachings of this invention. In U.S. Pat. No. 4,176,247 for "SIGNALS SCRAMBLER-UNSCRAMBLER FOR BINARY CODED TRANSMISSION SYSTEM", R. M. Englund, operations of shift registers in association with a signal scrambler-unscrambler system, are detailed. At each clock pulse, a M-bit binary word from the M stages of such register is generated. In like manner, in FIGS. 3a and 3b, the input signal to be counted is placed on input leads 211 and 311 in counters 21 and 31, respectively. Of importance is the fact that input leads 211 and 311 connect to the clock input leads of D-type flip-flops 21-1 through 21-M, and 31-1 through 31-M, respectively. As is well known to those in the art, in typical systems, there are several sources available to pulse such clock input leads. In the embodiments shown, both input leads 211 and 311 are connected to ROM enable lead 11 of FIG. 1, although it is to be understood that any other desired signal may serve the purpose of causing counters 21 and 31 to count. Output leads 210-1 through 210-M and 310-1 through 310-M carry output signals 212-1 through 212-M and 312-1 through 312-M, respectively. Output signals 212-1 and 312-1 are the least significant bits of the counter. Of importance, however, is the inclusion of input leads 213 and 313 which are connected to all of the clear input leads of D-type flip-flops 21-1 through 21-M and 31-1 through 31-M, respectively. Leads 213 and 313 are provided to ensure that the M-bit word carried by output leads 212-1 through 212-M and 312-1 through 312-M are identical. Periodically, a logical 1 input signal is applied simultaneously to input leads 213 and 313, thus setting flip-flops 21-1 through 21-M and 31-1 through 31-M to a logical 0 output state. The input signal applied to input leads 213 and 313 may be provided by a number of sources. For example, a specific address applied to address bus 10 may also trigger a pulse on input leads 213 and 313 derived from the internal circuitry (not shown) of ROM 1. Alternatively, an external reset clock (not shown) may be used which provides a logical 1 pulse periodically, provided the speed at which the reset clock operates is much slower than the operation speed of counters 21 and 31. FIGS. 3a and 3b show the specific connections of gates 24 and 34 in FIGS. 2a and 2b. In the example shown in FIGS. 3a and 3b the output leads of gates 24 and 34, respectively, are connected to the input leads of flip-flops 21-3 and 31-3, respectively. As shown in the embodiments of FIGS. 3a and 3b, the output leads of Exclusive-OR gates 201-2 and 301-2 are disconnected from input leads to flip-flops 21-3 and 31-3, respectively. Alternatively, the output leads of gate 201-2 and 24 (FIG. 3a) and 301-2 and 34 (FIG. 3b) may be connected together in a "wired AND" configuration. The input leads to gates 24 and 34 may be connected to any output lead of flip-flops 21-1 through 21-M and 31-1 through 31-M, respectively, and the output leads of gates 24 and 34 may be connected to the input leads of any of flip-flops 21-1 through 21-M and 31-1 through 31-M, respectively, provided that the connections of gate 24 are identical to the connections of gate 34.

The encoded output signals of encoding circuit 2 of FIG. 2a are carried by data bus 8, which includes a plurality of N data leads 8-1 through 8-N suitable for transmitting an N-bit encoded data word.

In FIG. 2b, the encoded data is applied to decoding circuit 3 via data bus 8. Exclusive-OR gate bank 33 contains a plurality of N Exclusive-OR gates 33-1 through 33-N, each uniquely associated with a single one of data leads 8-1 through 8-N, respectively. Each data lead 8-1 through 8-N in data bus 8 is connected to one input lead of its corresponding Exclusive-OR gate 33-1 through 33-N respectively, in Exclusive-OR gate bank 33. The other input leads of Exclusive-OR gates 33-1 through 33-N are connected to M-bit counter 31 by coding matrix 32. M-bit counter 31 is a means for generating an M-bit decoding word. M-bit counter 31 is constructed in the same manner as M-bit counter 21. The decoded output signal is provided on the output leads of Exclusive-OR gates 33-1 through 33-N. The decoded output word of circuit 3 is carried by data bus 9 which includes a plurality of N data transmission leads 9-1 through 9-N suitable for transmitting an N-bit decoded data word. Each transmission lead 9-1 through 9-N is uniquely connected to one of the output leads of Exclusive-OR gates 33-1 through 33-N.

Figure 4:
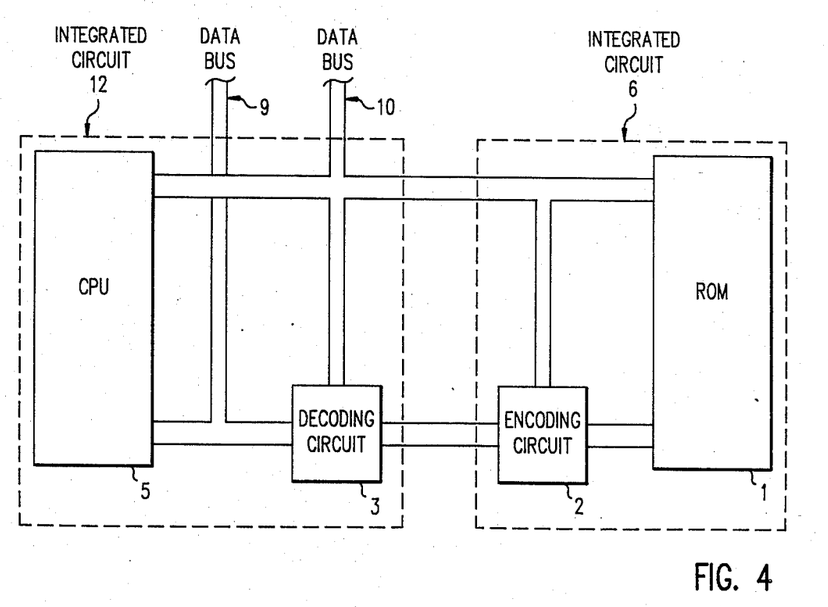
FIG. 4 is a block diagram of a microprocessor accessing data from a read-only memory, where the decoding circuitry is contained in the microprocessor chip.
Figure 5A:
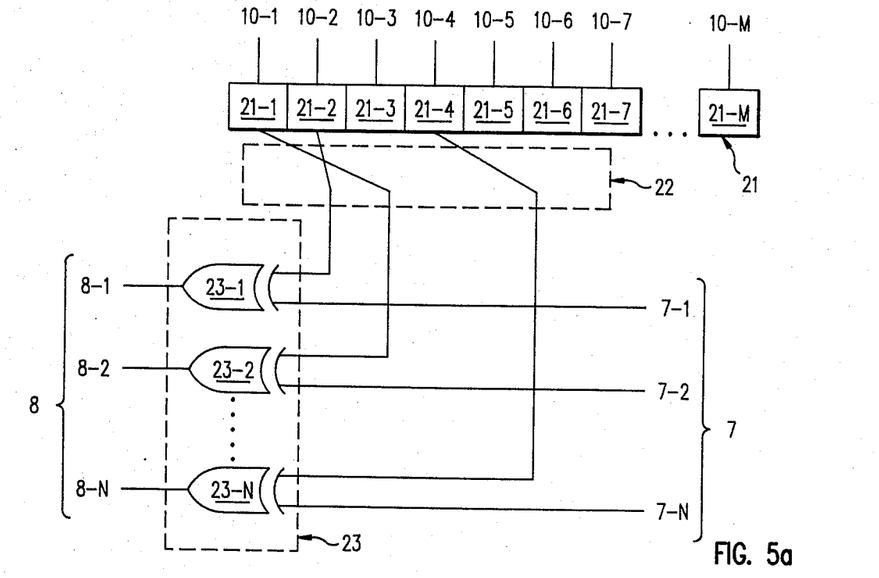
FIGS. 5a and 5b are schematic diagrams showing one embodiment of the encoder and decoder, respectively, of the present invention suitable for use in the structure of FIGS. 3a and 3b.
Figure 5B:
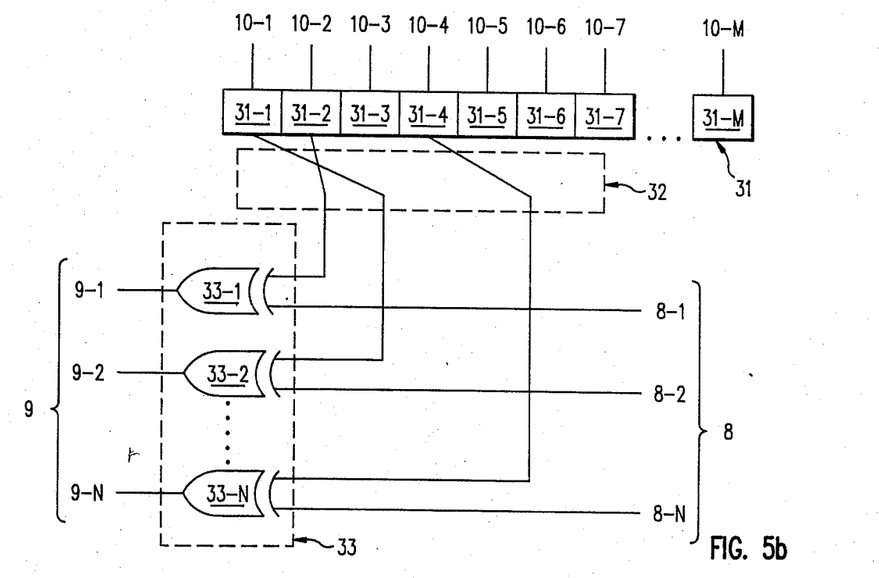

The M-bit word provided by M-bit counter 21 need not be provided by a counter. FIG. 4 and FIGS. 5a and b show one embodiment of the present invention. FIG. 4 is the block diagram of a microprocessor accessing data from a read-only memory (ROM) where the decoding circuitry is contained in the microprocessor chip. FIGS. 5a and 5b are schematic diagrams showing one embodiment of the encoder and decoder of the present invention. It is thus seen by these figures that the logical word on address bus 10 of FIG. 4 is used in FIGS. 5a and 5b for encoding and decoding purposes, viz, as the M-bit encoding word in FIG. 5a and the M-bit decoding word in FIG. 5b. The M-bit word received by coding matrix 22 may be any M-bit word, provided means are used to ensure that the M-bit logical word provided to decoding matrix 32 is the same as the M-bit logical word provided to encoding matrix 22.

Similarly, coding matrix 22 may connect the second input lead of any of the Exclusive-OR gates in Exclusive-OR gate bank 23 with any bit in the M-bit word contained in M-bit counter 21 provided the connections in coding matrix 22 are exactly the same in the encoding circuit 2 in FIG. 2a as in coding matrix 32 in decoding circuit 3 in FIG. 2b. If N is the number of data lines, where N is a positive integer, and M is the number of bits in the M-bit encoding/decoding word, then the number of possible coding matrices is M!/N!. If M is less than N, the second input leads of selected Exclusive-OR gates may be left unconnected or if M is greater than N, two second input leads may be connected to one bit of the M-bit encoding/decoding word.

The effect of the encoding/decoding circuitry on a particulaar bit of the N bit data word is shown in Table 1. For example, if the data bit is a logical 0 and, also for example, the code bit provided by the N-bit encoding word and coding matrix 22 is a logical 0, the output signal on data lead 8-x, where x is a positive integer between 1 and N, for that particular bit in encoded data output bus 8 is a logical 0. The M-bit decoding word in decoding circuit 3 of FIG. 2b is the same M-bit word as in encoding circuit 2 of FIG. 2a. The coding matrix 32 in decoding circuit 3 must connect the second input leads of Exclusive-OR gate bank 33 to predetermined stages of the M-counter 31 in the same manner as the connections made by coding matrix 22 in encoding circuit 2. Therefore, the code bit provided by the decoder 3 in Table 1 is the same as the code bit provided by the encoder 2 in Table 1, in this example a logical 0. The Exclusive-OR gate in decoding circuit 3 for this particular bit combines the logical 0 on encoded data bus 8 and the logical 0 code bit to provide an output signal of 0, the same as the input bit on input bus 7.

Alternatively, if the data bit provided by data input bus 7 is a logical 1 and the code bit provided by the M-bit counter 21 and coding matrix 22 is also a logical 1, the output signal on encoded data bus 8 for that particular data bit is a logical 0. That logical 0 bit on encoded data bus 8 is combined in circuit 3 with the logical 1 decoding bit provided by the decoding word. Therefore, the output signal will be a logical 1, the same as the input data bit. Table 1 shows that for any combination of data bit and code bit the output signal on data bus 9 is exactly the same as the input data bit on data bus 7.

Figure 6A:
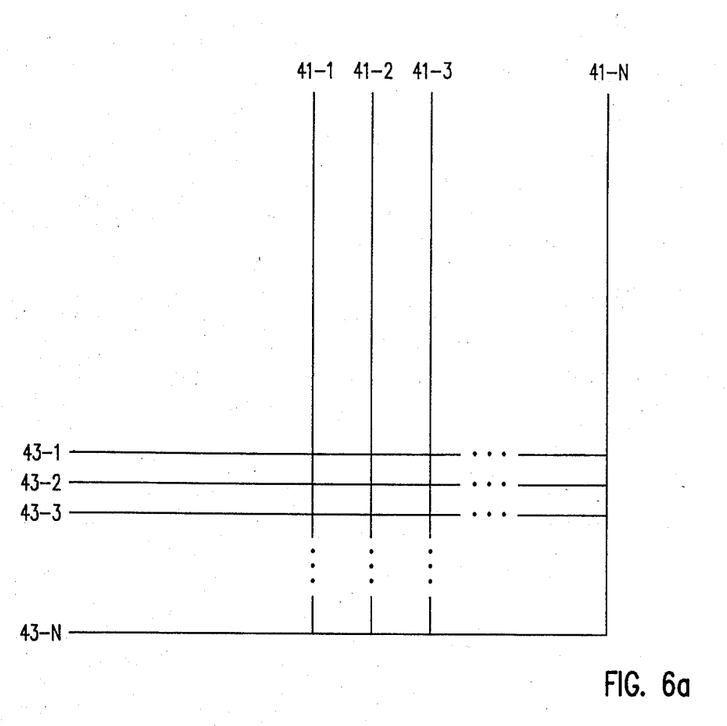
FIG. 6a shows an integrated circuit electrical conductor pattern which is one method of implementing the matrix of the described embodiment of invention.
Figure 6B:
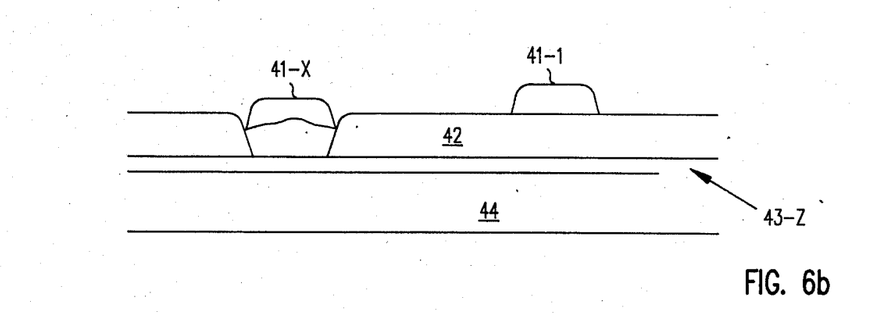

Coding matrix 22 may be constructed in a number of ways. One method which can be used when the invention is implemented in an integrated circuit is to construct the metal conductor pattern of the integrated circuit corresponding to the desired combination of connections between the M-bit word contained in M-bit counter 21 and the Exclusive-OR gates in Exclusive-OR gate bank 23. This is an efficient method of construction of the matrix. Many ROMs are programmed by altering the metalization mask used to make the conductor on the ROM chip. The matrix can simply be developed during this step. Another method of constructing coding matrices 22 and 32 is shown in FIGS. 6a and 6b. The conductors of the matrix are laid out in a square cross-hatch pattern as shown in FIG. 6a, where N is the number of leads in data buses 7, 8 and 9, and M is number of bits in M-bit counters 22 and 32. If the X-bit, where X is a number between 1 and M of M-bit word is to be connected to Exclusive-OR gate 23-Z, where Z is a number between 1 and N, then a hole in oxide insulator 42 is made and conductors 43-Z and 41-1 are thereby connected. If bit X of the M-bit word and Exclusive-OR gate Z are not to be connected then the oxide insulator 42 in between the two conductors is left intact. These examples are only particular embodiments of the coding matrix 22 in the present invention. The invention is by no means limited to these examples.

While this specification illustrates specific embodiments of this invention, it s not to be interpreted as limiting the scope of the invention. Many embodiments of this invention will become evident to those of ordinary skill in the art in light of the teachings of this specification.

TABLE 1

| Data Bit(7) | Encoder Code Bit(2) | Output Encoder/ Input Decoder(8) | Decoder Code Bit(3) | Output Decoder(9) |
| --- | --- | --- | --- | --- |
| 0 | 0 | 0 | 0 | 0 |
| 0 | 1 | 1 | 1 | 0 |
| 1 | 0 | 1 | 0 | 1 |
| 1 | 1 | 0 | 1 | 1 |

TABLE 2

| Exclusive OR | | |
| --- | --- | --- |
| Input 1 | Input 2 | Output |
| 0 | 0 | 0 |
| 0 | 1 | 1 |
| 1 | 0 | 1 |
| 1 | 1 | 0 |

I claim:
1. An encoding/decoding circuit comprising:
an encoded data transmission bus comprised of N encoded data transmission lines where N is any positive integer;
a first integrated circuit in which are located:

an input data bus comprised of N data input lines;
an encoding M-bit pseudo-random word generator serving as means for providing an M-bit encoding word, where M is any positive integer;
a bank of N encoding Exclusive-OR gates, each of said encoding Exclusive-OR gates having a first input lead connected to a different line of said input data bus, a second input lead connected to receive any bit of said M-bit encoding word, and an output lead;
wherein said output lead of each of said encoding Exclusive-OR gates is connected to said encoded data transmission bus;
a second integrated circuit chip in which are located:
a decoding M-bit pseudo-random word generator serving as means for providing an M-bit decoding word identical to said M-bit encoding word; and
a bank of N decoding Exclusive-OR gates, each said decoding Exclusive-OR gates having a first input lead connected to a different one of said encoded data transmission lines, a second input lead connected to receive one of said bits of said M-bit decoding word, and an output lead;
wherein said second input lead of each of said decoding Exclusive-OR gates is connected to receive the bit of said decoding M-bit logical word corresponding to an identical bit of said M-bit encoding word; and
an output data bus comprised of N decoded data output lines, each said decoded output line being connected to a different one of said output leads of said decoding Exclusive-OR gate bank.

2. An encoding/decoding circuit as in claim 1 wherein said pseudo-random word generators use the ROM enable signal of a microprocessor as the input signal which said pseudo-random word generators count.

3. An encoding/decoding circuit as in claim 1 where said encoding and decoding M-bit pseudo-random word generators are encoding and decoding counters connected to generate identical M-bit pseudo-random words.

4. An encoding/decoding circuit as in claim 3 wherein some output bits of each of said counters are combined in a logic gate and the output signal of said logic gate is provided as an input signal to another bit position of each of said counters, thereby generating said identical pseudo-random words.

5. An encoding/decoding circuit as in claim 1 wherein said encoding M-bit counter and said decoding M-bit counter are activated by a logical input lead which is common to both of said counters.

6. An encoding/decoding circuit as in claim 1 further comprising means for ensuring that said encoding and decoding M-bit pseudo-random word generators are initialized at the same time.

7. A data protection circuit comprising:
a data bus;
a first integrated circuit having means for generating encoded data from original data and placing said encoded data on said data bus;
a second integrated circuit having means for receiving said encoded data from said data bus and decoding said encoded data;
wherein said means for generating encoded data comprises an encoding M-bit pseudo-random word generator, means for forming a bit of said encoded data by generating an exclusive-OR bit from a bit of said original data and a bit from said encoding pseudo-random word generator; and
wherein said means for decoding said encoded data comprises: a decoding M-bit pseudo-random word generator which generates a bit matching the bit from said encoding M-bit pseudo-random word generator; and means for forming a bit of decoded data by generating an exclusive-OR bit from said bit of said encoded data and a bit from said decoding pseudo-random word generator matching said bit from said encoding pseudo-random word generator.

8. An encoding/decoding circuit as in claim 7 where said means for decoding said encoded data includes means for initializing said decoding M-bit pseudo-random word generator and said encoding M-bit pseudo-random word generator at the same time.

9. A method of encoding and decoding a data word having a plurality of bits which comprises the steps of:
encoding said data word by combining each bit of said data word with an associated bit of an encoding word in an associated one of a plurality of Exclusive-OR gates, thereby providing an encoded data bit on the output lead of each of said associated Exclusive-OR gates, and thus forming an encoded data word;
transmitting said encoded data word on data transmission means; and
decoding said encoded data word by combining each said encoded data bit of said encoded data word with an associated decoding bit of a decoding word in an associated one of a plurality of decoding Exclusive-OR gates, thereby providing a decoded data bit on the output lead of each said decoding Exclusive-OR gate, thereby forming a decoded data word;
wherein said encoding word and said decoding word may be any combination of bits provided they are at all times identical, and wherein said encoding and said decoding occur in separate integrated circuits and said transmission means is provided between said integrated circuits.

10. A method of encoding and decoding a data word as in claim 9 further comprising the step of generating said encoding word and said decoding word via pseudo-random word generators and providing that said encoding word and said decoding word are identical by sending a periodic reset signal to both of said pseudo-random word generators.

11. A method of encoding and decoding a data word as in claim 10 wherein both of said pseudo-random word generators comprise signals derived from a single source.

12. An encoding/decoding circuit comprising:
an encoded data transmission bus comprised of N encoded data transmission lines, where N is any positive integer;
an M-bit pseudo-random word generator serving as means for providing an M-bit encoding/decoding word, where M is any positive integer;
a first integrated circuit in which are located:
an input data bus comprised of N data input lines;
a ROM having data leads connected to said input data bus;
a bank of N encoding Exclusive-OR gates, each of said encoding Exclusive-OR gates having a first input lead connected to a different line of said input data bus, a second input lead connected to receive any bit of said M-bit encoding/decoding word, and an output lead;

wherein said output lead of each of said Exclusive-OR gates is connected from said first integrated circuit to said encoded data transmission bus;

a second integrated circuit in which are located:

a bank of N decoding Exclusive-OR gates, each said decoding Exclusive-OR gates having a first input lead connected to a different one of said encoded data transmission lines, a second input lead connected to receive one of said data bits of said M-bit encoding/decoding word, where said second input lead of each of said decoding Exclusive-OR gates is connected to receive the same bit of said M-bit logical word as said second input lead of an associated one of said encoding Exclusive-OR gates, each said decoding Exclusive-OR gate having an output lead; and an output data bus comprised of N decoded data output lines, each said decoded output line being connected to a different one of said output leads of said decoding Exclusive-OR gate bank, wherein said pseudo-random word generator provides a new M-bit encoding/decoding word upon receipt of a signal enabling said ROM of said first integrated circuit to provide data on said encoded data transmission bus.

13. The encoding/decoding circuit of claim 12 in which said M-bit pseudo-random word generating means comprises first and second separate M-bit pseudo-random word generators, said first word generator being associated with generating said M-bit encoding word within said first integrated circuit, said second word generator being associated with generating said M-bit decoding word within said second integrated circuit.

14. The circuit of claim 12 in which said M-bit pseudo-random word generating mean includes a single M-stage shift register means for generating simultaneously said M-bit encoding and decoding words.

15. The encoding/decoding circuit of claim 14 in which said M-bit pseudo-random word generating means includes a first M-stage shift register means for providing said M-bit encoding word and a second M-stage shift register means for simultaneous generation of said M-bit encoding and decoding words.

* * * * *